US008089369B2

(12) United States Patent
Stojanovic et al.

(10) Patent No.: US 8,089,369 B2
(45) Date of Patent: Jan. 3, 2012

(54) CHILD SEAT CHECK FIXTURE

(75) Inventors: Slavko Stojanovic, Farmington Hills, MI (US); Michael Robinson, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 457 days.

(21) Appl. No.: 12/371,975

(22) Filed: Feb. 17, 2009

(65) Prior Publication Data
US 2010/0207756 A1 Aug. 19, 2010

(51) Int. Cl.
*G08B 21/00* (2006.01)
(52) U.S. Cl. .................... 340/665; 73/862.51; 73/862.53
(58) Field of Classification Search .................. 340/665, 340/457.1; 180/268; 73/862.381, 862.51, 73/862.53
See application file for complete search history.

(56) References Cited

U.S. PATENT DOCUMENTS

| | | | |
|---|---|---|---|
| 6,561,543 B1 * | 5/2003 | Hamada et al. | 280/735 |
| 7,233,239 B2 | 6/2007 | Chitalia et al. | |
| 7,415,875 B2 | 8/2008 | Ante | |
| 7,975,562 B2 * | 7/2011 | Skarpil | 73/862.453 |
| 2005/0189805 A1 | 9/2005 | Burley et al. | |

* cited by examiner

*Primary Examiner* — Thomas Mullen
(74) *Attorney, Agent, or Firm* — Young Basile Hanlon & MacFarlane, P.C.

(57) ABSTRACT

Disclosed herein are embodiments of a check fixture for measuring the accessibility of a lower car seat anchor to a user installing a car seat, and methods thereof. One embodiment of a check fixture comprises a body having a rear end and a front end, the body defining a longitudinal axis. The front end comprises an anchor-engaging structure and the rear end comprises a force gauge interface. The fixture also comprises a flange at least partially circumferentially positioned around the body at a longitudinal position a distance from the front end. The flange includes a bearing surface substantially perpendicular to the longitudinal axis, the bearing surface sized and configured so that when the front end is moved into engagement with the anchor, the bearing surface engages the seating material adjacent the access aperture. The engagement of the flange with the seating material generates a reactive force.

20 Claims, 6 Drawing Sheets

CHILD SEAT CHECK FIXTURE

FIELD OF THE INVENTION

The present invention relates in general to a check fixture for a vehicle and a method of measuring with a check fixture for a vehicle. More particularly, the present invention relates to a check fixture to access the position of a lower car seat anchor in a vehicle and methods thereof.

BACKGROUND

The implementation of the Lower Anchors and Tethers for Children (LATCH) system for vehicles was intended to make child car-seat installation easier and safer, eliminating some installation issues that had been encountered when using the vehicle's safety belts to secure the child seat. The lower anchors were phased in by law starting in 2000, and they have been required in almost all cars and light trucks since 2002. The corresponding hooks have been required in all child-safety seats manufactured after about the same period. In addition, older vehicles can be retrofitted with tether anchors. The tether anchor kits can be purchased from manufacturers and retailers.

Since the implementation of the LATCH system, consumers have experienced various problems with the proper installation of car seats using the system. The lower anchor is positioned with a low profile so that occupants of the vehicle can sit without discomfort when the child seat is not in use, as it is positioned between the bottom seat cushion and the back seat cushion. However, vehicle manufacturers may not be consistent with its location, and a location too deep within the seat may make it too difficult for a consumer to access. In addition, the consumer may not be able to determine whether the car seat is properly latched to the anchor.

BRIEF SUMMARY

Disclosed herein are embodiments of a check fixture for measuring the accessibility of a lower car seat anchor to a user installing a car seat. One such embodiment of a check fixture measures the accessibility of a lower car seat anchor to a user installing a car seat, the anchor located adjacent to seating material defining an access aperture. The check fixture comprises a body having a rear end and a front end, the body defining a longitudinal axis. The front end comprises an anchor-engaging structure and the rear end comprises a force gauge interface. The fixture also comprises a flange at least partially circumferentially positioned around the body at a longitudinal position a distance from the front end. The flange includes a bearing surface substantially perpendicular to the longitudinal axis.

Also disclosed herein are methods of measuring the accessibility of a lower car seat anchor to a user installing a car seat. One method disclosed herein measures the accessibility of a lower car seat anchor to a user installing a car seat, the anchor located adjacent to seating material defining an access aperture. The method comprises providing a check fixture comprising a body with a rear end and a front end, the body defining a longitudinal axis. The front end comprises an anchor-engaging structure and the rear end comprises a force gauge interface. The check fixture also comprises a flange at least partially circumferentially positioned around the body at a longitudinal position a distance from the front end. The flange includes a bearing surface substantially perpendicular to the longitudinal axis. The fixture also comprises a force gauge coupled to the force gauge interface. The method further comprises inserting the front end of the body through the access aperture toward the anchor, generating a reactive force with the bearing surface against the seating material and measuring the reactive force with the force gauge.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

The check fixture embodiments and methods disclosed herein address the issues that have arisen with the use of the LATCH system. The check fixture embodiments can be used to properly position the lower anchor so that users installing child car seats can access the anchor without difficulty and ensure that the hook of the car seat is secure on the vehicle's lower anchor.

Certain terminology is used herein for purposes of reference only, and thus is not intended to be limiting. For example, terms such as "above," "below," "top" and "bottom" describe the orientation of portions of the component within a consistent but arbitrary frame of reference which is made clear by the reference to the text and the associated drawings describing the apparatus under discussion.

Figure 1:
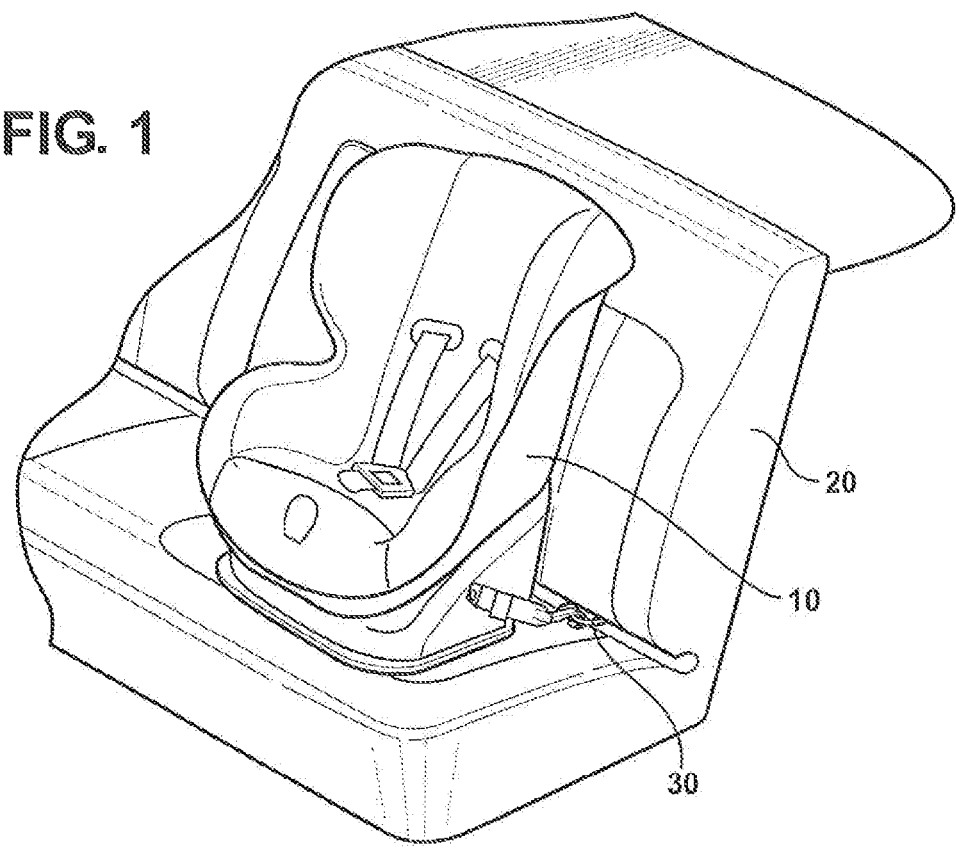
FIG. 1 is a perspective view of a vehicle seat on which a child seat is installed using the LATCH system.

FIG. 1 is a perspective view of a child seat 10 installed on a vehicle seat 20 using the LATCH system. The car seat 10 is shown for reference only and is non-limiting. Any car seat for use with a lower anchor can be used. The car seat 10 may be installed facing the front of the vehicle as shown, or installed to be rear facing as required or desired. The vehicle can be any vehicle having a lower anchor 30, whether manufactured with the lower anchor 30 or retrofitted with the anchor after manufacture.

Figure 2:
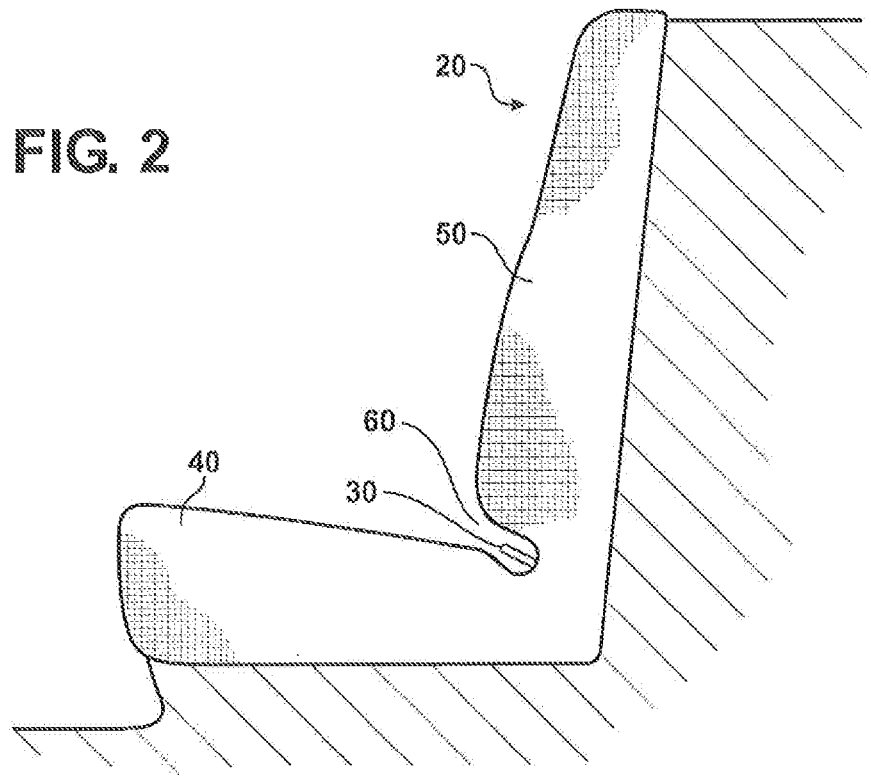
FIG. 2 is an exploded view of a lower anchor.

FIG. 2 is a side view of the vehicle seat illustrating the general location of the lower anchor 30 between the bottom seat cushion 40 and the back seat cushion 50. FIG. 2 illustrates the anchor 30 located adjacent the seating material of both cushions 40, 50, with the seating material defining an access aperture 60. It is this access aperture 60 in which a user must be able to insert a hook of the car seat and engage the lower anchor 30 with that hook. A non-limiting illustrative example of a child seat attachment hook is provided in FIG. 4.

Figure 4:
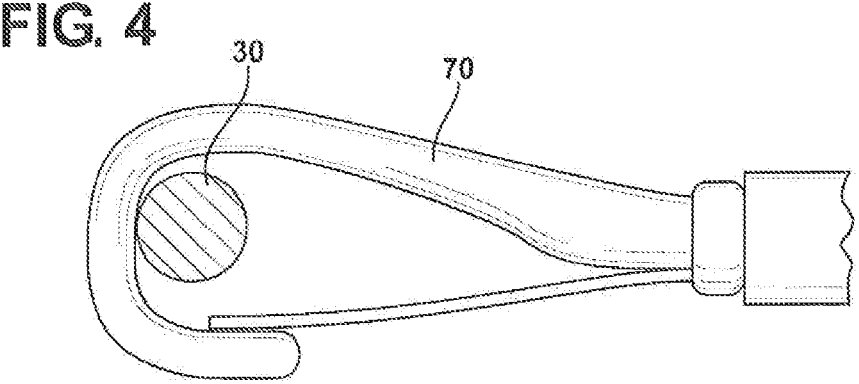
FIG. 4 is a side view of a child seat hook.

FIG. 4 shows a side view of the hook 70 in engagement with a cross section of the anchor 30. Another non-limiting example of a car seat hook would be a push-on connector, rather than the hook style shown.

Figure 3:
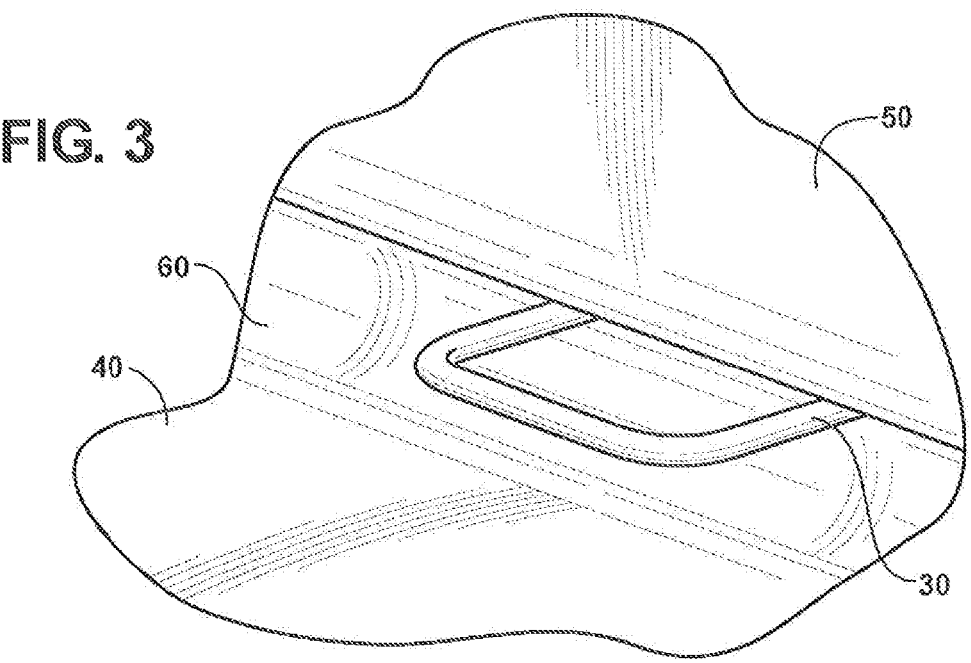
FIG. 3 is a cross-sectional view of a vehicle seat illustrating the general location of the lower anchor.

FIG. 3 is an exploded view of the lower anchor 30 shown positioned between the bottom seat cushion 40 and the back seat cushion 50. Again, the access aperture 60 is shown. The anchor 30 shown is provided by way of illustration and is not limiting. The anchor configuration can be any configuration that serves to restrain a car seat while meeting any state and federal requirements for lower anchors, if any.

Figure 5:
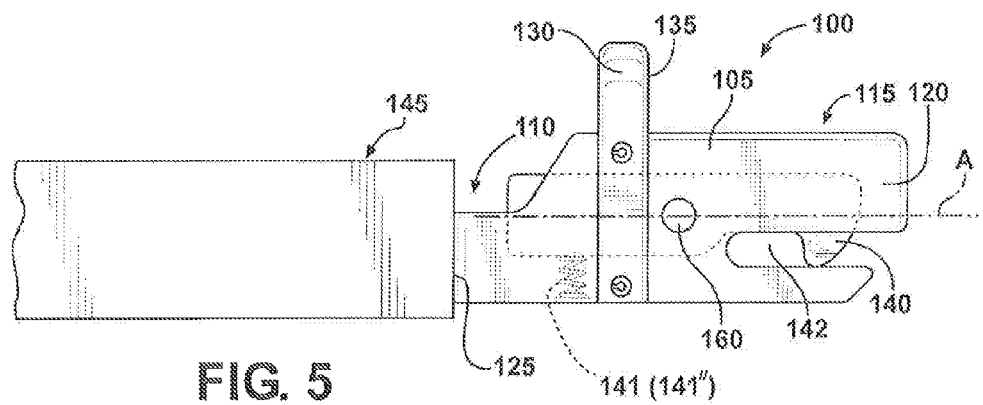
FIG. 5 is a side view of an embodiment of the check fixture as disclosed herein and attached to a force gauge.

FIG. 5 is a side view of an embodiment of a check fixture 100 disclosed herein. The check fixture 100 comprises a body 105 having a rear end 110 and a front end 115. The body 105 defines a longitudinal axis A of the fixture. As used herein, longitudinal axis A is the axis of the body 105 running from the front end 115 to the rear end 110 or vice versa. The front end 115 comprises an anchor-engaging structure 120 and the rear end 110 comprises a force gauge interface 125. The check fixture 100 also comprises a flange 130 at least partially circumferentially positioned around the body 105 at a longitudinal position a distance from the front end 115. The flange 130 includes a bearing surface 135 substantially perpendicular to the longitudinal axis A and facing the front end 115 of the check fixture 100.

In the embodiment of the check fixture 100 shown in FIG. 5, the anchor-engaging structure comprises a latching mechanism 140 configured to latch the anchor 30 when the anchor-engaging structure 120 sufficiently engages the anchor 30. The latching mechanism 140 can simulate the car seat hook, for example, as shown in FIG. 4. The latching mechanism 140 can be biased to the closed position with a spring 141. When the latching mechanism 140 is forced open by the anchor 30, the spring 141 compresses to a compressed configuration 141' shown in FIG. 11. When the anchor 30 is sufficiently engaged, the spring 141 expands to an expanded configuration 141" shown in FIGS. 5 and 11, raising the rear end of the latching mechanism 140, thereby moving the front end of the latching mechanism 140 around a pivot and back to the closed position. The latching mechanism 140 in FIG. 5 is shown by way of example and is not meant to be limiting. The latching mechanism 140 can be configured in any way desired or required to achieve the same result. However, it is contemplated that the anchor-engaging structure 120 may not have a latching mechanism 140 as shown in FIG. 5. In this case, the anchor 30 would move to the back of a slot 142 in the anchor-engaging structure 120 without latching.

The body 105 of the check fixture 100 is not limited to the shape shown in FIG. 5. However, it is contemplated that the profile of the front end 115 with the anchor-engaging structure 120 will account for at least the minimum clearance needed during operation of installing and removing any type of car seat hook. The slot 142 dimensions of the front end 115 can simulate the dimensions of the car seat hook, including the hook style shown in FIG. 4 and the push-on type.

The shape of the rear end 110 of the body 105 is not limited to that shown in FIG. 5. The rear end 110 is configured with the force gauge interface 125 to interface with a force gauge 145, shown in FIG. 5. The rear end 110 can be sized to allow a user to maneuver the front end 115 of the body 105 into and out of an access aperture, such as the access aperture 60 shown in FIGS. 2 and 3. However, the check fixture 100 can also be maneuvered holding the interfaced force gauge 140. The front end 115 and rear end 110 can be one integral piece or can be more than one piece and attached to form the whole of the body 105.

As noted above, the flange 130 is positioned at least partially circumferentially around the body 105 with the bearing surface 135 perpendicular to the longitudinal axis A of the body 105. The bearing surface 135 faces the front end 115 of the body 105 and is located a distance from the front end 115 of the body 105. In one embodiment, the distance from the front end 115 to the bearing surface 135 is such that the flange 130 represents the position of a user's hand on a car seat hook during installation. The bearing surface 135 is sized and configured so that when the front end 115 of the body 105 is moved into engagement with an anchor 30 such as that shown in FIGS. 2 and 3, the bearing surface 135 engages the seating material 40, 50 adjacent the access aperture 60 shown in FIGS. 2 and 3. The engagement of the flange 130 with the seating material 40, 50 generates a reactive force.

The shape of the flange 130 with the bearing surface 135 shown in FIG. 5 is illustrative and non-limiting. The flange 130 can be a different shape, for example, circular or triangular. The thickness of the flange 130 is not limited to that illustrated. The flange 130 can be completely circumferential about the body 105, or less than that shown. It is contemplated that the flange 130 may be able to move along the longitudinal axis A and lock into various positions representing different distances from the front end 115 as desired or required. The flange 130 can be a separate piece attached to the body 105 by any means or can be molded with the body 105. In addition, the bearing surface 135 is illustrated as being smooth and planar, but it is not limited to this configuration. The bearing surface 135 may rough and/or non-planar.

As noted above, FIG. 5 also shows the force gauge 145. The force gauge 145 is adjacent the rear end 110 of the check fixture 100. The force gauge 145 will interface with the force gauge interface 125 of the rear end 110 of the check fixture 100 to measure the reactive force generated by engagement of the bearing surface 135 of the flange 130 with the seating material 40, 50 of the vehicle seat when the check fixture 100 is inserted into the access aperture 60 and toward the anchor 30. The force gauge 145 may also be used to measure the force created to engage the anchor-engaging structure 120 with the anchor 30. It should be noted that the degree of engagement with the seating material and lower anchor is dependent on the position of the lower anchor and/or the amount of force applied. This will be described in more detail with respect to the method. However, the anchor-engaging structure 120 of the check fixture 100 may or may not engage the anchor 30 during use of the check fixture 100 and force gauge 145.

The force gauge 145 can be integrally coupled to the force gauge interface 125 or removably coupled to the force gauge interface 125. The force gauge 145 can be, for example, a strain gauge, a compression gauge, mechanical, digital, etc. The force gauge 145 can be any device that will provide indication of the amount of force exerted against at least the flange 130 of the check fixture 100.

Figure 6:
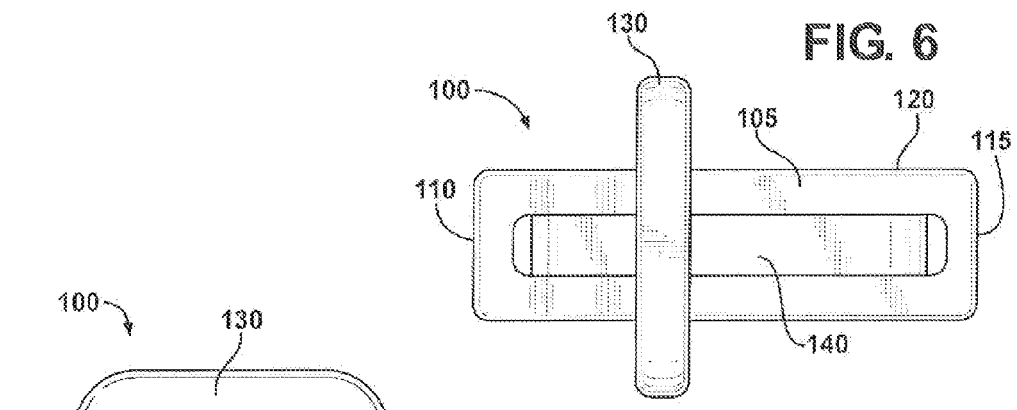
FIG. 6 is a plan view of an embodiment of the check fixture as disclosed herein.

FIG. 6 is a top view of the check fixture 100 of FIG. 5. In this embodiment of the check fixture 100, the top of the body 105 is partially open, exposing the top of the latching mechanism 140. The body 105 is open to allow clearance for the latching mechanism 140 to open and close. The opening also allows for visual confirmation of engagement with the anchor 30 and the user can observe the latching mechanism 140 move. However, the check fixture is not limited to this design. The top of the body 105 may be more partially or fully enclosed as long as clearance is allowed for the type of latching mechanism to operate, if a latching mechanism is included.

Figure 7:
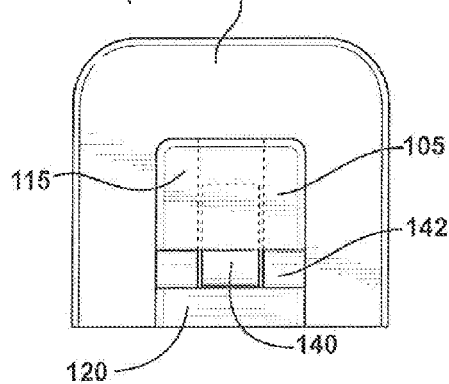
FIG. 7 is a front view of an embodiment of the check fixture as disclosed herein.

FIG. 7 is a front view of the check fixture 100 of FIG. 5. The flange 130 can be seen to partially circumferentially surround the body 105 of the check fixture 100. The slot 142 is shown with the latching mechanism 140 in a closed position.

Embodiments of the check fixture 100 can further comprise one or more engagement indicators configured to indicate when the anchor 30 is sufficiently engaged by the anchor-engaging structure 120. The engagement indicator can be one or more of audible and visual indicators. The engagement indicator can be, for example, one or more of a light, a scribe line, a mechanical sound, an automated sound and a verbal confirmation. Other means of indication can be used as contemplated by those skilled in the art. An example of an audible engagement indicator is the sound produced from contact of the latching mechanism 140 with the body 105 when the latching mechanism 140 has sufficiently engaged the anchor 30.

Figure 8:
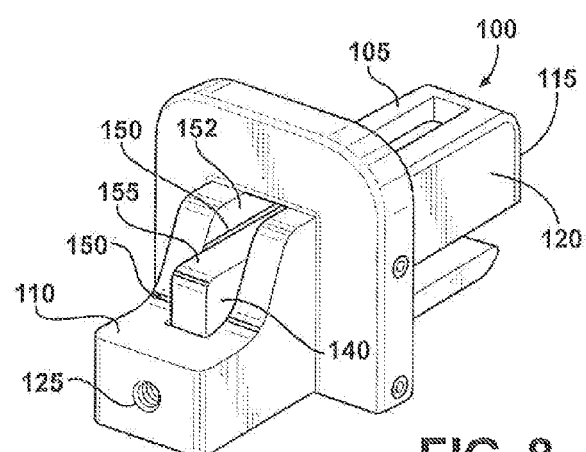
FIG. 8 is a rear perspective view of an embodiment of the check fixture as disclosed herein.

FIG. 8 is a rear perspective view of the check fixture 100 of FIG. 5. An example of an engagement indicator is shown in FIG. 8 as a scribe line 150. The scribe line 150 is located on one or both of internal sides 152 of the body 105 at the rear end 110. The scribe line 150 and the latching mechanism 140 align when the latching mechanism 140 has sufficiently latched the anchor 30. The scribe line 150 can be engraved, embossed, drawn, or any other means of transcribing the line.

Also shown in FIG. 8 is the force gauge interface 125 of the rear end 110 of the body 105. The force gauge interface 125 shown is of a threaded connector. This is provided by way of example and not limitation. As noted above, the force gauge 145 (shown in FIG. 5) can be integral to the check fixture 100 or can be removably attached in any means known to those skilled in the art.

Embodiments of the check fixture 100 disclosed herein can also comprise a disengagement lever 155 configured to disengage the anchor-engaging structure 120 from the anchor 30. The disengagement lever 155 can be, for example, the rear end of the latching mechanism 140, as shown in FIG. 8. The user can press on the disengagement lever 155 such that the latching mechanism 140 moves about the pivot 160 (shown in FIG. 5) so that the latching mechanism 140 opens and the anchor 30 can be released from the anchor-engaging structure 120. Other disengagement means can be used by those skilled in the art to disengage the anchor-engaging structure 120.

Also disclosed herein are methods of measuring the accessibility of a lower car seat anchor with the use of a check fixture 100. The methods disclosed herein measure the accessibility of a lower car seat anchor to a contemplated vehicle user installing a car seat. The check fixture will be used by anyone checking the location of the anchor, including but not limited to vehicle manufacturers, mechanics, owners retrofitting vehicle, and the like. The lower anchor 30 of which accessibility is being measured is located adjacent to seating material 40, 50 of a vehicle seat 20 defining an access aperture 60 as shown in FIGS. 2 and 3.

Figure 9:
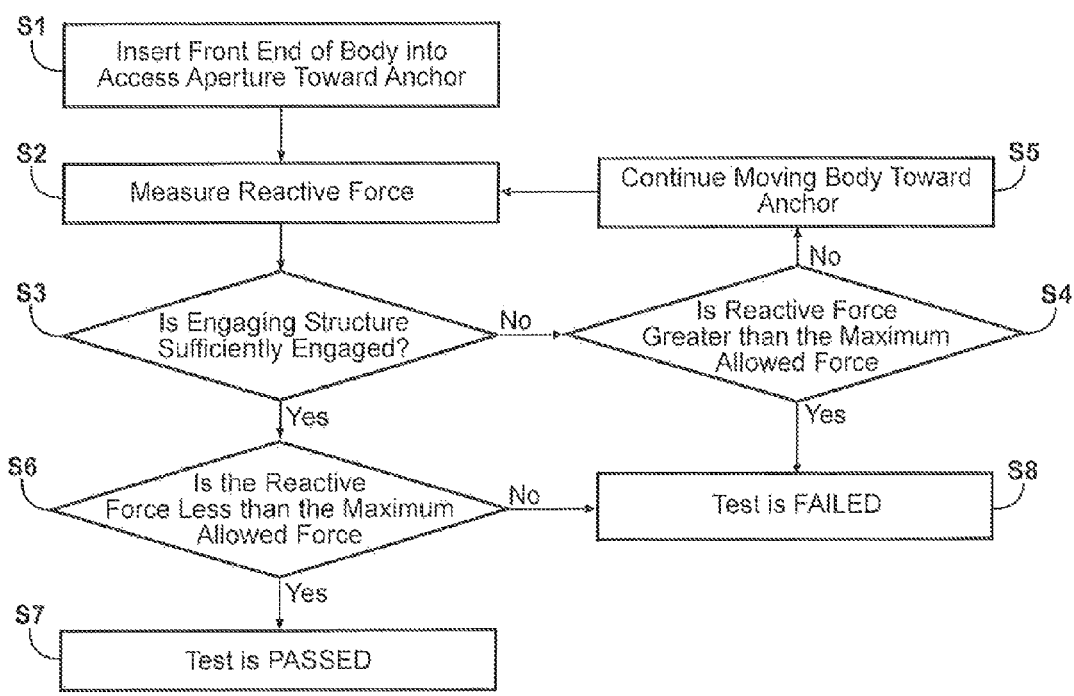
FIG. 9 is a flow diagram of a method disclosed herein of checking the accessibility of a lower anchor.

Referring to FIG. 9, the method comprises providing a check fixture 100 such as that shown in FIG. 5, with a body 105 having a rear end 110, a front end 115 comprising an anchor-engaging structure 120 and a flange 130. The force gauge interface 125 of the rear end 110 is attached to the force gauge 145. The first step is to insert the front end 115 of the body 105 through the access aperture 60 toward the anchor 30 (S1).

Figure 10:
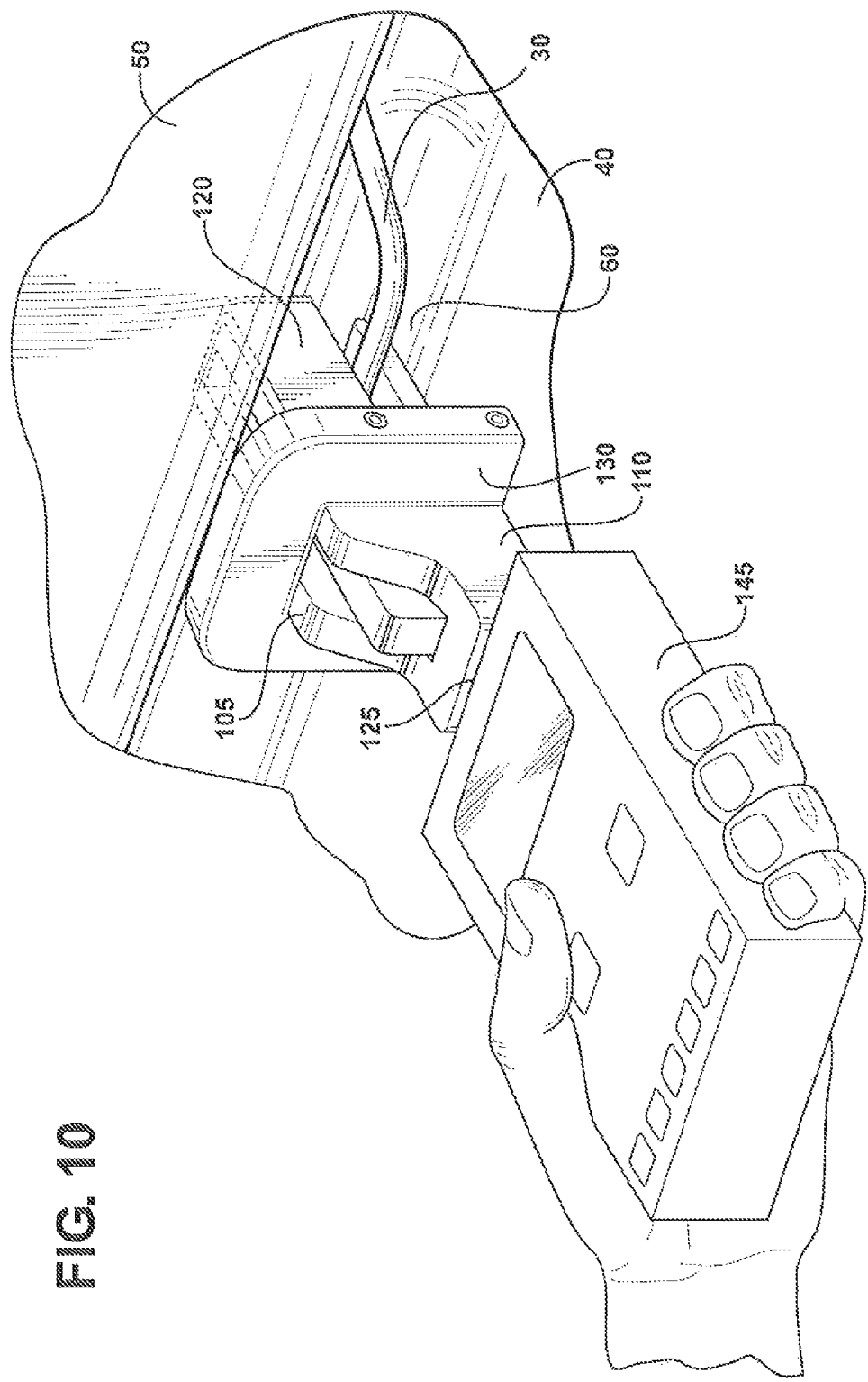
FIG. 10 is a perspective view of an embodiment of the check fixture as disclosed herein in use.

In FIG. 10, the force gauge 145 is shown coupled to the body 105 of the check fixture 100 and grasped by a user. As discussed above, the check fixture 100 can be grasped at any location behind the flange 130 comfortable to the user. As shown in FIG. 10, the force gauge 140 is grasped by a human hand; however, it is contemplated that the method may be automated and performed by a robot and the like.

Continuing in FIG. 9, as the anchor-engaging structure 120 approaches the anchor 30, a reactive force RF is generated (S2) when the flange 130 comes into engagement with the seating material 40, 50. Engagement of the anchor is checked. (S3) If the engaging structure 120 is sufficiently engaged, the method proceeds to step S6. If the engaging structure 120 is not sufficiently engaged, the method proceeds to step S4. If the reactive force RF is greater than the maximum allowed force at step S4, the test has failed. (S8) If the reactive force RF has not reached the maximum allowable force, the front end 115 continues to be moved toward the anchor 30. (S5)

If at step S3 the engaging structure 120 is sufficiently engaging the anchor 30, the reactive force RF is compared to the maximum allowable force. (S6) If the reactive force RF is greater than the maximum allowed, the test has failed. (S8) If the reactive force RF is less than the maximum allowed force, the test is passed. (S7)

Figure 11:
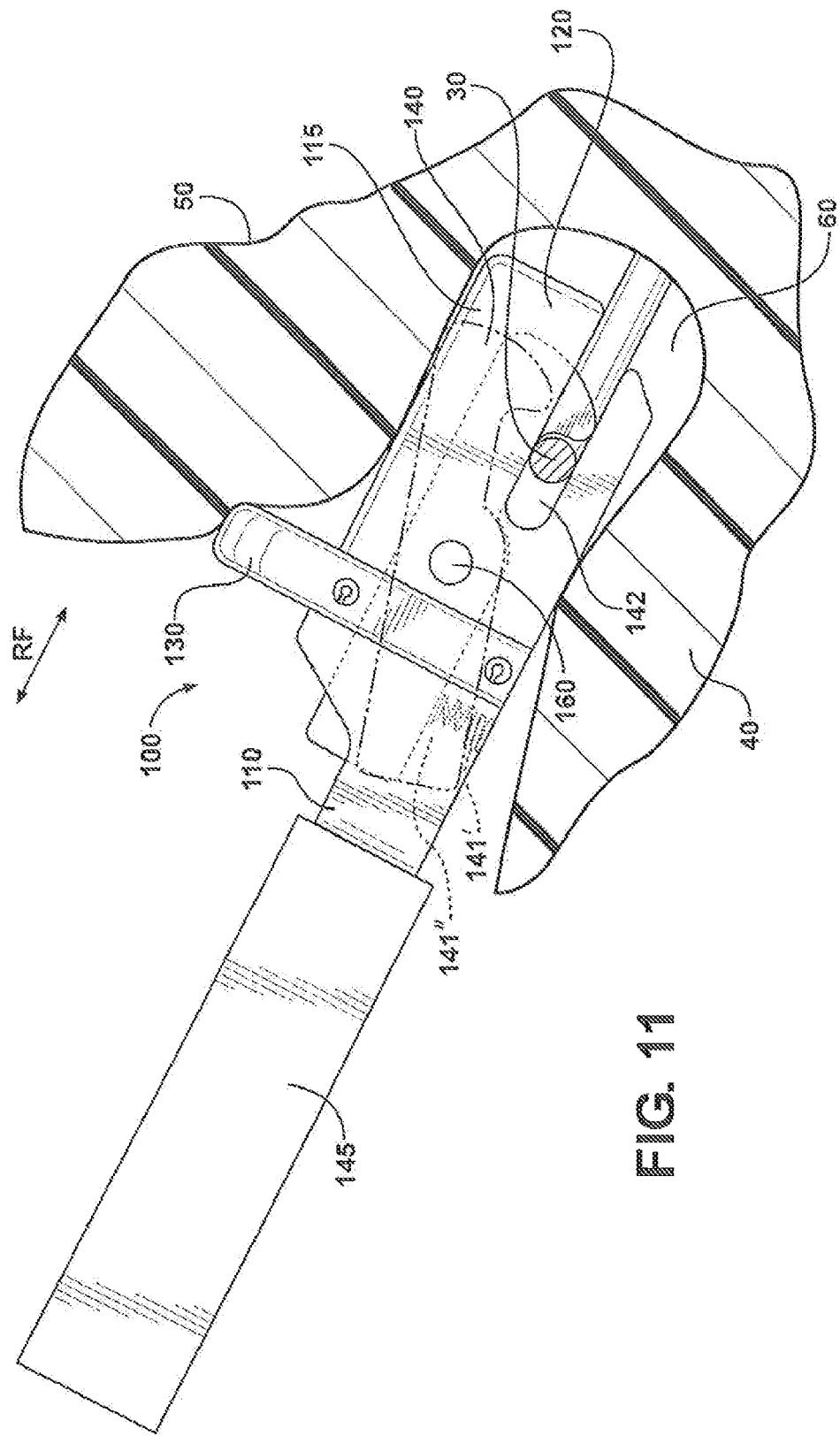
FIG. 11 is a side view of an embodiment of the check fixture as disclosed herein in engagement with a lower anchor in a vehicle seat.

FIG. 11 is a side view of the front end 115 of the check fixture 100 inserted into the access aperture 60. As shown in FIG. 11, the flange 130 is pressed against the back seating material 50. In this illustration, as the user pushes the check fixture 100 so that the anchor-engaging structure 120 approaches the anchor 30, the flange 130 of the check fixture 100 presses against and slightly into the seating material 50 while attempting to sufficiently engage the anchor-engaging structure 120 with the anchor 30. The reactive force can be measured throughout the test with the force gauge. Typically, the maximum force recorded is used as the judge of quality of the anchor 30 positioning. However, the test may end if the force reaches a maximum value prior to engagement.

If the anchor-engaging structure 120 reaches the anchor 30, the front end of the latching mechanism 140 will be forced by the anchor to rotate about the pivot 160 to open and receive the anchor 30, thereby compressing the spring 141 to the compressed configuration 141'. When the anchor 30 is sufficiently engaged in the slot 142 and no longer pressing on the front of the latching mechanism 140, the latching mechanism 140 will spring back around the pivot 160 to its closed position as the spring 141 expands to the expanded configuration 141".

The following scenarios are contemplated to occur during the method of measuring the anchor accessibility. A maximum acceptable force can be designated. If a measured force is greater than this maximum force, the lower anchor should be moved to a more accessible position. An anchor that is too deep within the seating material may not be accessible to the anchor-engaging structure at all. Therefore, there is no need to record the reactive force as it is obviously above the maximum allowable as the check fixture cannot reach the anchor. The anchor engaging mechanism might sufficiently engage the anchor, however, the force required to reach engagement with the anchor may exceed the maximum acceptable force. Therefore, the anchor should be repositioned to be more accessible. The anchor engaging mechanism might sufficiently engage the anchor with a force required that is within the acceptable range, which indicates the anchor is sufficiently positioned. These scenarios are meant to be descriptive to assist in understanding the method. They are not meant to be limiting. Other scenarios may occur depending on the configuration of the anchor being checked. For example, the check fixture can be moved toward the anchor until the maximum reactive force is reached. If the anchor is not engaged with the anchor-engaging structure before or when the maximum reactive force is reached, the anchor is not sufficiently accessible.

The method can further comprise receiving indication from the engagement indicator that the anchor has been engaged. The engagement indicator can be one or more of audible and visual indicators. The engagement indicator can be, for example, one or more of a light, a scribe line, a mechanical sound, an automated sound and a verbal confirmation as described above. Receiving indication can be visually observing that the latch mechanism is properly positioned with respect to the scribe line. Receiving indication can be audibly observing one of the sounds described. For example, a latching mechanism can make a sound when it is sufficiently closed about the anchor and makes contact with the body.

The method can further comprise disengaging the anchor-engaging structure from the anchor with a disengagement lever as described above.

The check fixture is described with reference to determining the accessibility of a lower anchor in a vehicle. However, the check fixture is not limited to this use. The check fixture can be used to check to position of other anchors or the like in spaces that are required to be accessible.

The check fixture can be made of any material desired or required. It is contemplated that the check fixture can be made of metal, plastic, or any other material that will maintain its shape under the reactive forces applied.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A check fixture for measuring the accessibility of a lower car seat anchor to a user installing a car seat, the anchor located adjacent to seating material defining an access aperture, the check fixture comprising:
   a body having a rear end and a front end, the body defining a longitudinal axis, wherein the front end comprises an anchor-engaging structure and the rear end comprises a force gauge interface; and
   a flange at least partially circumferentially positioned around the body at a longitudinal position a distance from the front end, wherein the flange includes a bearing surface substantially perpendicular to the longitudinal axis.

2. The check fixture of claim 1, wherein the bearing surface is sized and configured so that when the front end is moved toward engagement with the anchor, the bearing surface engages the seating material adjacent the access aperture; and wherein the engagement of the flange with the seating material generates a reactive force.

3. The check fixture of claim 2 further comprising a force gauge coupled to the force gauge interface and configured to measure the reactive force.

4. The check fixture of claim 3, wherein the force gauge is one of integrally coupled to the force gauge interface and removably coupled to the force gauge interface.

5. The check fixture of claim 1 wherein the anchor-engaging structure further comprises:
   a latching mechanism configured to latch the anchor when the anchor-engaging structure engages the anchor.

6. The check fixture of claim 5, further comprising:
   an engagement indicator configured to indicate when the anchor is sufficiently engaged by the latching mechanism.

7. The check fixture of claim 6, wherein the latching mechanism is the engagement indicator configured to audibly indicate upon latching when the anchor is sufficiently engaged by the latching mechanism.

8. The check fixture of claim 1, further comprising:
   an engagement indicator configured to indicate to the user that the anchor is engaged by the anchor-engaging structure.

9. The check fixture of claim 8, wherein the engagement indicator is one or more of audible and visual.

10. The check fixture of claim 9, wherein the engagement indicator is one or more of a light, a scribe line, a mechanical sound, an automated sound and a verbal confirmation.

11. The check fixture of claim 1, further comprising a disengagement lever configured to disengage the anchor-engaging structure from the anchor.

12. The check fixture of claim 1, wherein the front end of the body defines a slot that is configured to simulate slot dimensions of at least one of a plurality of car seat connectors that are configured to receive the anchor.

13. The check fixture of claim 1, wherein the longitudinal position of the flange is selected to approximate a location of a user's hand when engaging a lower car seat latch to the anchor.

14. A method of measuring the accessibility of a lower car seat anchor to a user installing a car seat, the anchor located adjacent to seating material defining an access aperture, the method comprising:
   providing a check fixture comprising:
      a body with a rear end and a front end, the body defining a longitudinal axis, wherein the front end comprises an anchor-engaging structure and the rear end comprises a force gauge interface;
      a flange at least partially circumferentially positioned around the body at a longitudinal position a distance from the front end, wherein the flange includes a bearing surface substantially perpendicular to the longitudinal axis; and
      a force gauge coupled to the force gauge interface;
   inserting the front end of the body through the access aperture toward the anchor;
   generating a reactive force with the bearing surface against the seating material; and
   measuring the reactive force with the force gauge.

15. The method of claim 14, wherein the check fixture further comprises an engagement indicator, the method further comprising:
   producing an indication from the engagement indicator that the anchor-engaging structure is sufficiently engaged with the anchor, and wherein measuring the reactive force with the force gauge occurs when the anchor-engaging structure is indicated as being sufficiently engaged with the anchor.

16. The method of claim 15, wherein the anchor-engaging structure comprises a latching mechanism configured to latch the anchor when the anchor-engaging structure engages the anchor.

17. The method of claim 16 further comprising:
   producing an indication from the engagement indicator that the latching mechanism is sufficiently engaged with the anchor.

18. The method of claim 15, further comprising:
   receiving the indication produced from the engagement indicator comprises at least one of visually observing a light, visually observing a scribe line, audibly observing a mechanical sound, audibly observing an automated sound and audibly observing a verbal confirmation.

19. The method of claim 14, wherein the check fixture further comprises a disengagement lever, the method further comprising:

disengaging the anchor-engaging structure from the anchor with the disengagement lever.

20. The method of claim 14, wherein inserting the front end of the body through the access aperture simulates inserting a child seat connector into the access aperture to anchor the child seat.

* * * * *